(12) United States Patent
Curcio et al.

(10) Patent No.: US 7,701,915 B2
(45) Date of Patent: Apr. 20, 2010

(54) METHOD IN A COMMUNICATION SYSTEM, A COMMUNICATION SYSTEM AND A COMMUNICATION DEVICE

(75) Inventors: Igor Curcio, Tampere (FI); Emre Aksu, Tampere (FI); Ru-Shang Wang, Coppell, TX (US); Keith Miller, Plano, TX (US)

(73) Assignee: Nokia Corporation, Espoo (FI)

( * ) Notice: Subject to any disclaimer, the term of this patent is extended or adjusted under 35 U.S.C. 154(b) by 953 days.

(21) Appl. No.: 10/876,262

(22) Filed: Jun. 24, 2004

(65) Prior Publication Data
US 2005/0025180 A1 Feb. 3, 2005

Related U.S. Application Data

(60) Provisional application No. 60/550,443, filed on Mar. 4, 2004, provisional application No. 60/483,157, filed on Jun. 27, 2003.

(51) Int. Cl.
*H04Q 7/28* (2006.01)
(52) U.S. Cl. .................. 370/341; 709/227; 370/468
(58) Field of Classification Search ......... 370/276–282; 709/227, 249
See application file for complete search history.

(56) References Cited

U.S. PATENT DOCUMENTS

| 6,125,136 | A | 9/2000 | Jones et al. |
|---|---|---|---|
| 6,487,255 | B1 | 11/2002 | Arslan et al. |
| 2002/0120749 | A1* | 8/2002 | Widegren et al. ........... 709/227 |
| 2004/0057412 | A1* | 3/2004 | Curcio et al. ............... 370/341 |

FOREIGN PATENT DOCUMENTS

| JP | 2003-506981 | 2/2003 |
|---|---|---|
| RU | 2158479 | 10/2000 |
| WO | WO 0307552 | 9/2003 |

OTHER PUBLICATIONS

Davide Mandato; "*Concepts for Service Adaptation, Scalability and QoS Handling on Mobility Enabled Networks*"; IST-1999-10050 BRAIN; retrieved Nov. 11, 2004 from the Internet: http://staffx.webstore.ntu.edu.sg/personal/ceandreas/Shared%20Documents/papers/BRAIN%20Del%201.2; chapter 2.4.7 and abstract.

(Continued)

*Primary Examiner*—Seema S Rao
*Assistant Examiner*—Wanda Z Russell
(74) *Attorney, Agent, or Firm*—Alfred A. Fressola; Ware, Fressola, Van Der Sluys & Adolphson LLP

(57) ABSTRACT

A method in a communication system, a communication system and a communication device wherein in the method media streams are transmitted from a sending communication device to a receiving communication device at least partly via a wireless communication network. At least one media stream is selected to be transmitted to the receiving communication device. QoS requirements for transmitting the selected at least one media stream are defined, transmission resources are reserved from the wireless communication network for the transmission of at least one media stream, and a setup procedure is performed between the receiving communication device and the sending communication device for activating the one packet data transmission connection.

23 Claims, 4 Drawing Sheets

OTHER PUBLICATIONS

ETSI TS 101 329-3 V2.1.2; "*Telecommunications and Internet Protocol Harmonization Over Networks (TIPHON) Release 3; End-to-end Quality of Service in TIPHON systems; Part 3: Signalling and control of end-to-end Quality of Service (QoS)*"; Jan. 2002; retrieved from Internet: http://webapp.etsi.org/action%5CPU/20020115/ts_10132 903v020102p.; chapter 7.3.

3GPP TS 26.234 V0.2.2+updates; "Technical Specification Group Services and System Aspects; Transparent end-to-end packet switched streaming service (PSS); Protocols and codecs (Release 6);" May 9, 2003; http://www.3gpp.org/ftp/tsg_sa/WG4_CODEC/TSGS4_26/Docs/S4-030336.zip; p. 21.

* cited by examiner

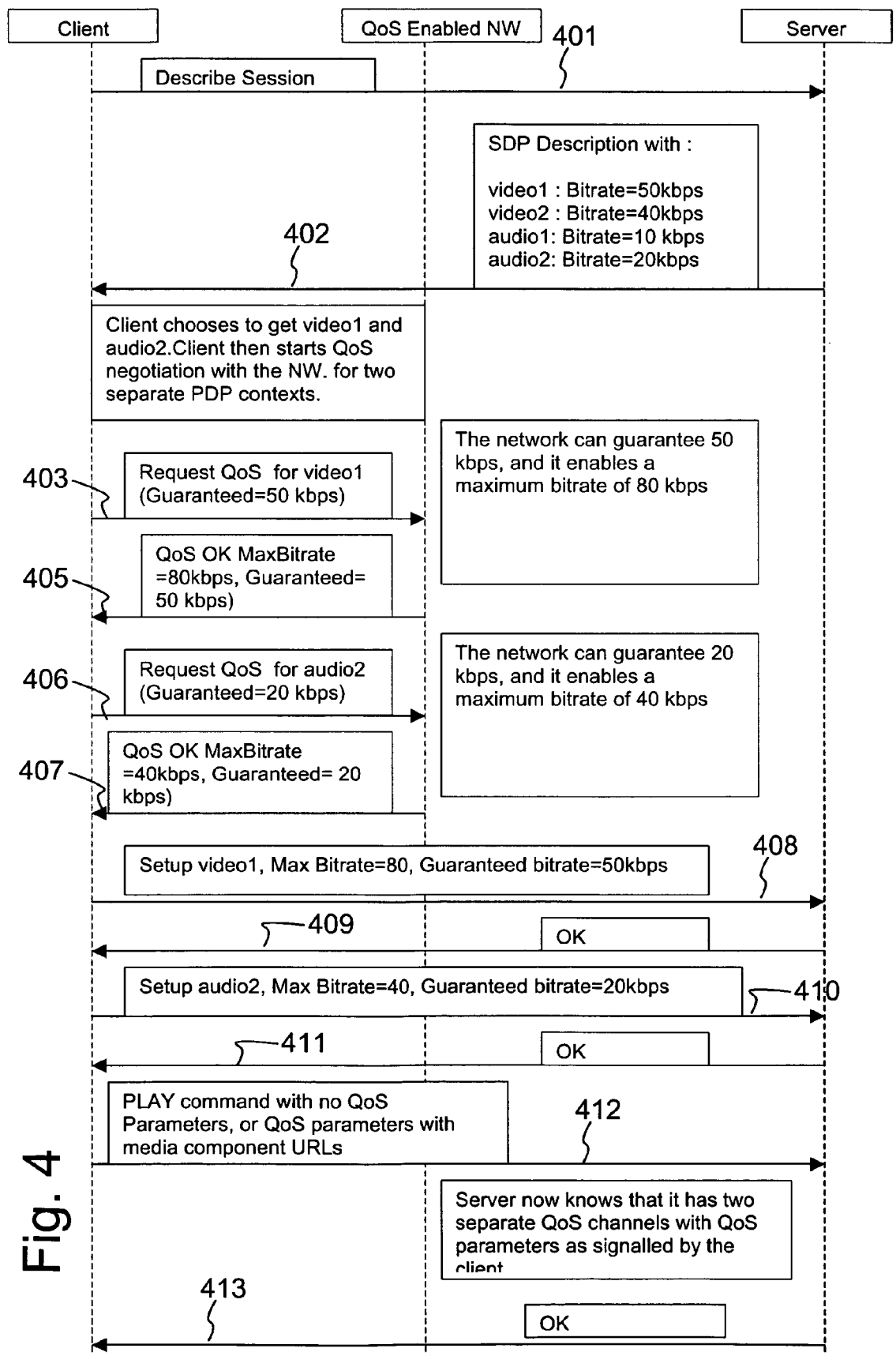

METHOD IN A COMMUNICATION SYSTEM, A COMMUNICATION SYSTEM AND A COMMUNICATION DEVICE

CROSS REFERENCE TO RELATED APPLICATIONS

This application claims priority under 35 USC §119 to U.S. Provisional Patent Application No. 60/550,443 filed on Mar. 4, 2004 and U.S. Provisional Patent Application No. 60/483, 157 filed on Jun. 27, 2003.

FIELD OF THE INVENTION

The technology area is that of streaming media over mobile networks, where a multimedia server, a mobile network and a streaming client are logically connected e.g. via an RTSP protocol (Real Time Streaming Protocol) used for session setup and control, and e.g. an RTP protocol (Real Time transport Protocol) for media transfer. Streaming systems can be rate adaptive or not. This invention is related to rate adaptive streaming systems that can adapt the content and/or transmission rate to the varying network channel conditions.

The present invention relates to a method in a communication system, in which multimedia streams are transmitted from a sending communication device to a receiving communication device at least partly via a wireless communication network. The invention also relates to a communication system comprising a sending communication device, a receiving communication device, and a communication network to transmit multimedia streams from the sending communication device to the receiving communication device at least partly via a wireless communication network. The invention further relates to a sending communication device and a receiving communication device.

BACKGROUND OF THE INVENTION

In this description, the term sending communication device refers to a communication device including a transmitter being arranged to send multimedia streams to a communication network. The term receiving communication device refers to a communication device including a receiver for receiving multimedia streams from the communication network, respectively. It is obvious that the same communication device may include both the transmitter and the receiver whereby allowing one-way or two-way communication with the communication network. A wireless communication device includes a transmitter and/or a receiver implementing wireless communication in a wireless communication network. The term wireless communication system, such as a mobile communication system, generally refers to any communication system which makes a wireless data transmission connection possible between a wireless communication device and stationary parts of the system, the user of the wireless communication device moving within the operating range of the system. A typical wireless communication system is a Public Land Mobile Network (PLMN). A well-known example is the GSM system (Global System for Mobile telecommunications). The invention preferably relates to the third generation of mobile communication systems. As an example, the Universal Mobile Telecommunications System (UMTS) is used as an example of such a third-generation communication system.

In third generation systems, the terms bearer service and service are used. A bearer service is a telecommunication service type which provides the facility to transmit signals between access points. In general, the bearer service corresponds to the term of a traffic channel which defines, for example, the data transmission rate and the quality of service (QoS) to be used in the system when information is transmitted between a wireless communication device and another part of the system. The bearer service between the wireless communication device and the base station is, for example, a radio bearer service, and the bearer service between the radio network control unit and the core network is, for example, an Iu bearer service (Interface UMTS bearer). In the UMTS system, the interface between the radio network control unit and the core network is called Iu interface. In UMTS there is also the so called GERAN part, which uses, in addition to the Iu interface, also an interface called as Gb interface. In this connection, the service is provided by the mobile communication network for performing a task (tasks); for example, data services perform data transmission in the communication system, telephone services are related to telephone calls, multimedia, etc. Thus, the service requires data transmission, such as a telephone call or the transmission of multimedia streams, between the wireless communication device and the stationary parts of the system. One important task of the operation of a third-generation mobile communication system is to control (initialize, maintain and terminate, according to the need) bearer services in such a way that each requested service can be allocated to mobile stations without wasting the available bandwidth.

The quality of service determines, for example, how protocol data units (PDU) are processed in the mobile communication network during the transmission. For example, QoS levels defined for connection addresses are used for controlling the transmission order, buffering (packet strings) and rejecting packets in support nodes and gateway support nodes, particularly when two or more connections have packets to be transmitted simultaneously. The different QoS levels determine, for example, different delays for packet transmissions between the different ends of the connection, as well as different bit rates. Also, the number of rejected and/or lost packet data units may vary in connections with different QoS levels.

It is possible to request for a different QoS for each PDP context. For example, in e-mail connections, a relatively long delay can be allowed in the transmission of streams. However, real-time interactive applications, such as video conferencing, require packet transmission at a high rate. In some applications, such as file transfers, it is important that the packet switched transmission is faultless, wherein in error situations, the packet data units are retransmitted, if necessary.

For the packet switched communication service in the UMTS system, the defining of four different traffic classes has been proposed, and for the properties of these traffic classes, the aim has been to consider the different criteria for the different connection types. One criterion defined for the first and second classes is that the transmission takes place in real time, wherein the transmission must have no significant delays. However, in such classes, the accuracy of the data transfer is not such an important property. In a corresponding manner, non-real time data transmission is sufficient for the third and fourth traffic classes, but a relatively accurate data transmission is required of them. An example of real-time first-class communication is the transmission of conversational speech signals in a situation in which two or more persons are discussing with each other by means of wireless communication devices. An example of a situation in which real-time second-class communication might be feasible, is the transmission of a video signal for immediate viewing (streaming). Third-class non-real time packet communication can be used, for example, for the use of database services, such as the browsing of Internet home pages, in which the relatively accurate data transmission at a reasonable rate is a more important factor than the real-time data transmission. In the system according to this example, for example the transfer of e-mail messages and files can be classified to the fourth category. Naturally, the number of traffic classes is not necessarily four as mentioned here, but the invention can be applied in packet switched communication systems comprising any number of traffic classes. The properties of the four presented traffic classes are briefly presented in Table 1.

future, it will be possible to set up multimedia calls, for example, for real-time video conferences and the like.

The requirements of different applications may be significantly different. Some applications require fast communication between the sender and the receiver. These applications include, for example, video and telephone applications. Some other applications may require as accurate data transmission as possible, but the bit rate of the data transmission connection is less important. These applications include, for example, e-mail and database applications. On the other

TABLE 1

| | Class | | | |
|---|---|---|---|---|
| | First class (conversational class): real-time, e.g. telephone conversation guaranteed capacity no acknowledgement | Second class (streaming class): real-time, e.g. video information guaranteed capacity acknowledgement possible buffering on application level | Third class (interactive class): interactive best effort method acknowledgement Internet browser, Telnet real-time control channel | Fourth class (background class): background transmission by the best effort method acknowledgement background loading of e-mail messages, calendar events, etc. |
| Maximum bit rate (kbps) | <2048 | <2048 | <2048-overhead | <2048-overhead |
| Delivery order | Yes/No | Yes/No | Yes/No | Yes/No |
| Maximum packet size (Bytes) (SDU) | ≦1500 or 1502 | ≦1500 or 1502 | ≦1500 or 1502 | ≦1500 or 1502 |
| Transmission of incorrect packets (SDU) | Yes/No/— | Yes/No/— | Yes/No/— | Yes/No/— |
| Residual bit error ratio | $5*10^{-2}, 10^{-2}, 5*10^{-3}, 10^{-3}, 10^{-4}, 10^{-5}, 10^{-6}$ | $5*10^{-2}, 10^{-2}, 5*10^{-3}, 10^{-3}, 10^{-4}, 10^{-5}, 10^{-6}$ | $4*10^{-3}, 10^{-5}, 6*10^{-8}$ | $4*10^{-3}, 10^{-5}, 6*10^{-8}$ |
| Packet error ratio (SDU) | $10^{-2}, 7*10^{-3}, 10^{-3}, 10^{-4}, 10^{-5}$ | $10^{-1}, 10^{-2}, 7*10^{-3}, 10^{-3}, 10^{-4}, 10^{-5}$ | $10^{-3}, 10^{-4}, 10^{-6}$ | $10^{-3}, 10^{-4}, 10^{-6}$ |
| Transmission delay (ms) | 100 ms-maximum value | 250 ms-maximum value | | |
| Guaranteed bit rate (kbps) | <2048 | <2048 | | |
| Traffic processing priority | | | 1, 2, 3 | |
| Allocation priority | 1, 2, 3 | 1, 2, 3 | 1, 2, 3 | 1, 2, 3 |

The guaranteed bit rate is used for admission control and resource reservation at the RAN and CN, the maximum bit rate is used for policing at the CN, i.e. no higher than the maximum bit rate is allowed to enter the CN at the GGSN, packets that exceed this bit rate will be dropped.

Modern second and third generation wireless communication devices have much better data processing properties than older wireless communication devices. For example, they already have the facility of connecting to the Internet and using a browsing application in the wireless communication device to retrieve information from the Internet, and in the hand, these applications can be used in several wireless communication devices with different properties.

The user of the wireless communication device may be willing to watch a multimedia presentation with the wireless communication device. The user finds the loading address of such a presentation and sends a request to send the presentation to the wireless communication device. The request is handled in the communication system. The loading address of the requested multimedia presentation may address to a server in a communication network, such as a server of the Internet. The server which delivers the multimedia presentation to the receiving wireless communication device is called as a streaming server in this description.

The communication system should reserve enough resources for the communication between the streaming server and the wireless communication device to be able to deliver the requested multimedia presentation. Otherwise the presentation may not be presented with the same accuracy and error free in the receiving wireless communication device. In the UMTS communication system the wireless communication device requests a PDP context with certain QoS parameters first. Then, the network selects a bearer for the connection by using some selection bases, for example, the parameters the wireless communication device has possibly used in the request. Such selection bases may not be appropriate or accurate enough wherein situations may occur in which the bearer service can not provide enough transmission capacity for the connection, or it provides more capacity than is needed, wherein the usage of the network resources is not efficient.

Another situation in which a delivery of multimedia information may be needed is two wireless communication devices communicating with each other to exchange multimedia information such as video or still images. Also in this kind of situation enough resources should be reserved by the network for the communication. However, when using prior art methods it is not always possible to inform both ends of the connection about the demands for the connection.

Basic streaming systems are non-adaptive. For example, the current Packet Switched streaming Service (PSS) defined by 3GPP in releases 4 and 5 is non-adaptive. Packet Switched streaming Service in Rel. 6 will be adaptive. The adaptive characteristic is given by the ability of the system, i.e. both a streaming server and a client, to adapt to the varying network channel conditions such as changes in the QoS negotiated channel bit rates, transfer delays, other Quality of Service parameters, or even changes in the underlying network in case of handovers.

In order to make the system adaptive, some communication between the streaming server and clients must be established. This is already in place whenever the RTSP protocol is used for session set-up and control. However, the transmission of the necessary information between the server and the client must occur in a correct way in order to guarantee that the system is adaptive and ultimately the best user Quality of Service for audio and video streaming can be achieved.

For this purpose, some prior art techniques already enable the transmission of QoS information, coming from the underlying mobile network, from a streaming client to a streaming server. This allows more cooperation between the two ends in order to make the system more adaptive.

What has not been specified so far is the relation between the QoS parameters in a specific mobile network environment and the PDP (Packet Data Protocol) context usage. For instance, different cases are possible. In the following, the associated RTCP flow related to each RTP media stream is not considered. Alternatively, considering the RTP and its associated RTCP flow as a part of the same multimedia stream does not change the nature of the problem:
1. A PDP context carries only one media of a streaming session
2. A PDP context carries all the media of a streaming session in a case when there is more than one media.

If the streaming client decides to signal to the streaming server e.g. via RTSP some of the QoS profile parameters, for example the guaranteed bit rate, the maximum bit rate or the transfer delay, some problems may occur to the server in the correct interpretation of the QoS profile and, in the end, in the nature of the network connection.

In RTSP there are two possible kinds of sessions, which are a so called aggregate controlled session and a non-aggregate controlled session. The aggregate controlled session is a session where, at the transport level, all media components can be controlled by a single command sent to the server by the client (e.g. one RTSP PLAY command for both audio and video components). If this does not happen, i.e. at least one media component is controlled individually in a session, then the session is said to have non-aggregate control.

In the following, some examples are disclosed to clarify the problems which relate to the negotiation of QoS parameters for multimedia streams. It should be noted that the examples and the different parameters used in the examples are non-restrictive and in practical implementations different kind of parameters and combinations of media streams may exist.

EXAMPLE 1

In this example the multimedia stream includes two medium (e.g. one audio stream and one video stream). All the different media are transmitted using a single PDP context.

It is supposed that the streaming client has received notification from the streaming server (e.g. via the SDP protocol), that the audio stream requires 12 kbps and the video bit stream requires 52 kbps. It is also supposed that the streaming client establishes a connection with the mobile network using a single PDP context, over which the client wishes to transmit both audio and video streams, and that the network has granted the PDP context with the following (among the others) QoS profile parameters:
Guaranteed bit rate=64 kbps
Maximum bit rate=70 kbps Now, let's suppose that the streaming client wants to inform the streaming server about the granted QoS from the network, in order to enable the system to be more adaptive. To increase the efficiency, the client is supposed to decide to signal this information before starting the playback of the two medium. Therefore, it chooses to signal the two fields above using the SETUP method. Since there are two media, the client will send the two fields embedded into two SETUP messages (one for audio and one for video), with the following information:
SETUP (Audio):
Guaranteed bit rate=12 kbps
Maximum bit rate=70 kbps
SETUP (Video):
Guaranteed bit rate=52 kbps
Maximum bit rate=70 kbps The guaranteed bit rate signalled in each SETUP contains the required bandwidth for each media (which is known to both streaming server and streaming client), but the maximum bit rate information can only be the granted maximum bit rate in the PDP context. Therefore, it cannot be anything else than 70 kbps in this example, because there would be no way to split the maximum bit rate between the two media. The SETUP method is interpreted by the streaming server as being a per-media description. Therefore, the server will interpret as if there will be virtually two network channels with the characteristics described by the two SETUP messages (one channel with guaranteed bit rate of 12 kbps and a maximum bit rate of 70 kbps, and another channel with guaranteed bit rate of 52 kbps and a maximum bit rate of 70 kbps). The cumulative guaranteed bit rate of the media is 12+52=64 kbps, which is the actual network guaranteed bit rate of the PDP context. The server is entitled to send a maximum bit rate of 70 kbps for audio and a maximum bit rate of 70 kbps for video. When a single PDP context is used, this means that the cumulative maximum bit rate of the medium is 70+70=140 kbps, which is not the network maximum bit rate for the PDP context. Since each media stream can be transmitted at variable bit rate, the sum of the instantaneous bit rates of the two medium can reach 140 kbps in any moment of time. However, every value greater than maximum bit rate provided by the network (70 kbps in this example) is not allowed, because the network resources are not available. Therefore, the server is led to mis-interpret the QoS information of the PDP context. This drives to bad user QoS.

On the other hand, thinking of splitting the 70 kbps maximum bit rate in a proportional way between the two media, is something that would lead the server to make a sub-optimal usage of the channel usage, which is shared by the different medium. The server would try to use the channel as if there were two separate PDP contexts.

A similar problem occurs if the guaranteed bit rate information sent to the server is what is really granted by the network in the PDP context. For instance, if the information of the granted 64 kbps guaranteed bit rate is sent to the server in both SETUPs messages, even more problems would be generated because the server will be entitled to send at a guaranteed bit rate of even 64 kbps of audio and 64 kbps of video, making a total guaranteed bit rate of 128 kbps, which is not available in the PDP QoS in this example. This would produce network buffer overflow and bad user QoS.

EXAMPLE 2

In this other example the multimedia stream also includes two medium (e.g. one audio stream and one video stream), but every different medium is transmitted using separate PDP contexts.

It is supposed that the streaming client has received notification from the streaming server (e.g. via the SDP protocol), that the audio stream requires 12 kbps and the video stream requires 52 kbps. It is also supposed that the streaming client establishes a connection with the mobile network using two separate PDP contexts, over which the client wishes to transmit respectively the audio and video streams, and that the network has granted the PDP context with the following (among the others) QoS profile parameters:
PDP context for Audio:
Guaranteed bit rate=12 kbps
Maximum bit rate=20 kbps
PDP context for Video:
Guaranteed bit rate=52 kbps
Maximum bit rate=64 kbps Now, let's suppose that the streaming client wants to inform the streaming server about the granted QoS from the network in order to enable the system to be more adaptive. The QoS information could be sent in a PLAY command. The PLAY command is generally interpreted by the server as being an aggregate session command. Therefore, only a couple of parameters must be sent. The client could decide to send a guaranteed bit rate=12+52=64 kbps, and a maximum bit rate=20+64=84 kbps. This confuses the server which will understand that a single PDP context is used with the specified QoS parameters, which is not the case in this example.

In both the above described example cases the main problem is that the streaming server does not know what is the type of the network channel reserved for data transfer (that can be either single or multiple PDP context), because it has no visibility on the PDP context allocation type. This visibility is only at the streaming client side.

SUMMARY OF THE INVENTION

It is thus an aim of the present invention to present a method and a system for attempting in solve the possible misunderstandings that the server might encounter when informed by the client about the QoS information of the network PDP context(s).

The aims of the invention are achieved by using different kinds of parameter signalling methods for informing the server about the session properties granted to the client by the network.

The present invention has advantages when compared to systems and methods of prior art. The invention allows to make a streaming server aware of the QoS parameters granted for each PDP context. This allows a better and more accurate adaptation by specifying a more precise QoS profile parameters.

The invention clears the conflict which occurs due to the single/multiple PDP context usage by the client for a streaming session, and the QoS Parameter signalling to the server.

If the procedure described in the invention is not used, then the multimedia session can not benefit from the QoS parameter information, but instead the quality of service risks to be severely degraded.

The invention makes use of the wireless streaming concepts and improves the multimedia streaming performance and adaptation for wireless domain, making use of the 3GPP specific protocols and codecs.

Another important advantage is given by the possibility to efficiently use the delta bandwidth computed as maximum bit rate—guaranteed bit rate. This bandwidth can be used for bandwidth adaptation or for handling peaks of video bit rate. Finally, this delta bandwidth can be used for delivering the best media quality when encoding multimedia streams in real-time, for example, by changing encoding parameters (including the media stream bit rate) on the fly that have impact on the bit rate.

DESCRIPTION OF DRAWINGS

In the following, the invention will be described in more detail with reference to the appended drawings, in which FIG. 4 shows a signalling diagram of QoS reservation and session control for a client with multiple PDP context support.

DETAILED DESCRIPTION OF THE INVENTION

Figure 1:
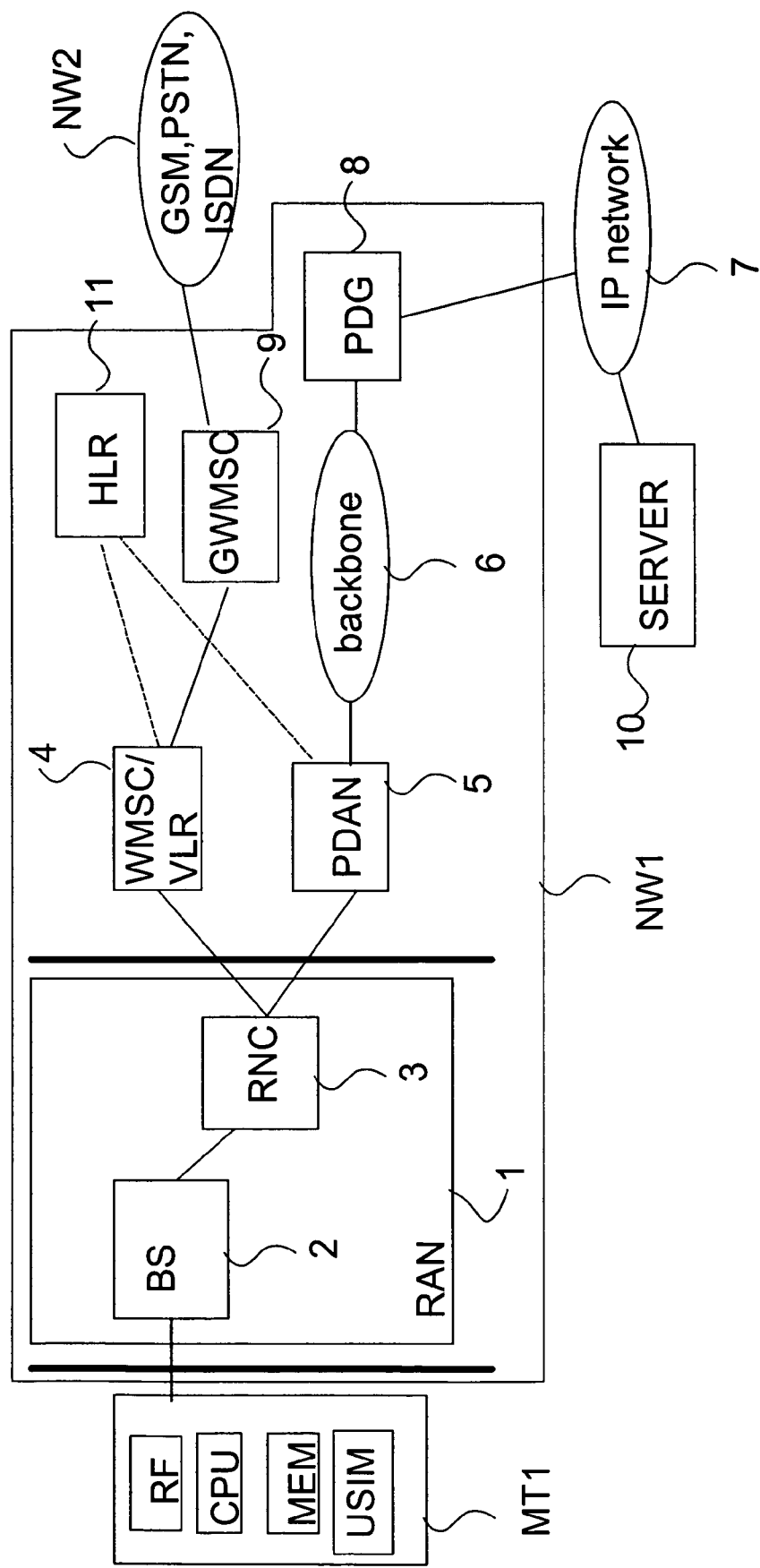
FIG. 1 shows a system in which the method according to a preferred embodiment of the invention can be applied.

In the following description of a preferred embodiment of the invention, a UMTS type mobile communication system will be used as an example; however, it will be obvious for anyone skilled in the art that the invention is not limited solely to this system but it can also be applied in other communication systems in which it is possible to determine various QoS levels for communication.

In the following the session description protocol (SDP) will be described in more detail.

On the Internet multicast backbone (Mbone), a session directory tool is used to advertise multimedia conferences and communicate the conference addresses and media-specific information necessary for participation. The multicast backbone is the part of the Internet that supports IP (Internet Protocol) multicast, and thus permits efficient many-to-many communication. It is used extensively for multimedia conferencing. Such conferences usually have the property that tight coordination of conference membership is not necessary; to receive a conference, a user at an multicast backbone site only has to know the conference's multicast group address and the UDP ports for the conference data streams.

Session directories assist the advertisement of conference sessions and communicate the relevant conference setup information to prospective participants. SDP is designed to convey such information to recipients. SDP is purely a format for session description—it does not incorporate a transport protocol, and can be conveyed with different protocols, including the Session Announcement Protocol, Session Initiation Protocol, Real-Time Streaming Protocol (RTSP), electronic mail using the MIME extensions, and the Hypertext Transport Protocol.

SDP is intended to be general purpose so that it can be used for a wider range of network environments and applications than just multicast session directories.

A multimedia conference is a set of two or more communicating communication devices along with the software they are using to communicate.

A multimedia session is a set of multimedia senders and receivers and the data streams flowing from senders to receivers. A multimedia conference is an example of a multimedia session.

In the following some details of the present definitions of session description protocol will be described. Some descriptions of the protocol are required and some are optional. Optional items are marked with a '*'.

Session description
    v=(protocol version)
    o=(owner/creator and session identifier).
    s=(session name)
    i=* (session information)
    u=* (URI of description)
    e=* (email address)
    p=* (phone number)
    c=* (connection information—not required if included in all media)
    b=* (bandwidth information)
        One or more time descriptions (see below)
    z=* (time zone adjustments)
    k=* (encryption key)
    a=* (zero or more session attribute lines)
        Zero or more media descriptions (see below)
Time description
    t=(time the session is active)
    r=* (zero or more repeat times)
Media description
    m=(media name and transport address)
    i=* (media title)
    c=* (connection information—optional if included at session-level)
    b=* (bandwidth information)
    k=* (encryption key)
    a=* (zero or more media attribute lines)

According to the above mentioned document the bandwidth description is defined as follows:
b=<modifier>:<bandwidth-value>

This specifies the proposed bandwidth to be used by the session or media, and is optional.

<bandwidth-value> is in kilobits per second by default. Modifiers may specify that alternative units are to be used.

<modifier> is a single alphanumeric word giving the meaning of the bandwidth figure. Two modifiers are initially defined:

CT (Conference Total): If the bandwidth of a session or media in a session is different from the bandwidth implicit from the scope, a 'b=CT: . . . ' line should be supplied for the session giving the proposed upper limit to the bandwidth used. The primary purpose of this is to give an approximate idea as to whether two or more sessions can co-exist simultaneously.

AS (Application-Specific Maximum): The bandwidth is interpreted to be application-specific, i.e., will be the application's concept of maximum bandwidth. Normally this will coincide with what is set on the application's 'maximum bandwidth' control if applicable. For RTP based applications, AS gives the RTP "session bandwidth" as defined in section 6.2 of RFC 1889 (RTP) (including media bit rate and UDP/IP headers overhead).

The Real Time Streaming Protocol is a client-server protocol for controlling the delivery of data with real-time properties. It is used to establish and control either a single or several time-synchronized streams of continuous media, such as audio and video. RTSP is conveyed with transport protocols such as UDP and TCP. In other words, RTSP acts as a network remote control for multimedia servers. Sources of data can include both live data feeds (e.g. real-time video and/or audio) and stored clips (e.g. still images). An RTSP client and server negotiate an appropriate set of parameters for media delivery, partially using e.g. SDP syntax to describe those parameters.

FIG. 1 shows a part of the UMTS system, comprising a wireless communication device MT1, a radio access node 1 (RAN) which comprises a base station 2 (BS), and a radio network controller 3 (RNC) which controls the base station 2 and routes the connections between the base station 2 and the rest of the system, a wireless mobile switching centre 4 (WMSC) and a packet data access node 5 (PDAN) as routing possibilities in addition to the radio network controller 3. The UMTS system according to FIG. 1 also comprises e.g. a backbone network 6 and a packet data gateway 8 (PDG) to other packet networks, such as the Internet Protocol (IP) network 7, wherein the wireless communication device can communicate with e.g. a server 10 coupled to the IP network. Furthermore, FIG. 1 shows a circuit switched gateway 9 (Gateway to Mobile services Switching Centre, GWMSC) to couple to e.g. to a second mobile communication network NW2, and a home location register 11 (HLR) e.g. to store the subscriber's access contract data.

Figure 2:
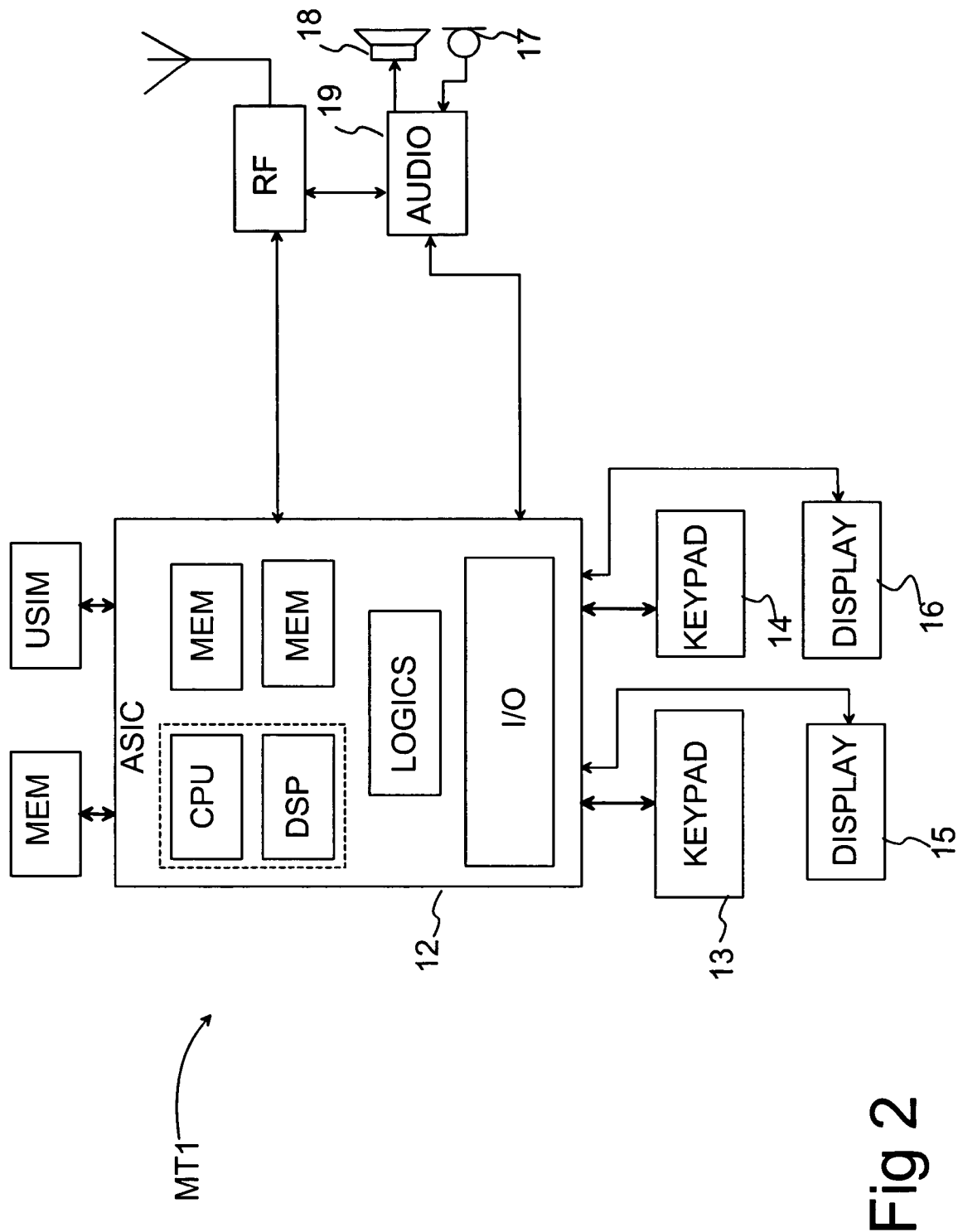
FIG. 2 shows a wireless communication device according to a preferred embodiment of the invention in a reduced block chart.

Further, FIG. 2 shows, in a reduced block chart, a wireless communication device MT1 complying with a preferred embodiment of the invention, which in this example is a communication device comprising data processing functions and mobile station functions, such as Nokia 9210i Communicator. The wireless communication device MT1 comprises e.g. one or more processors CPU, DSP, memory means MEM, the UMTS subscriber identity module (USIM) or corresponding means for identifying the subscriber, and a radio part RF for communication with the base station 2. The processor CPU can be integrated e.g. in an application specific integrated circuit 12 (ASIC), with which it is possible to perform a large number of the logical functions of the wireless communication device MT1. The memory means preferably comprise a random access memory (RAM), a read only memory (ROM), and at least part of the memory of the subscriber identity module USIM. The wireless communication device MT1 also comprises one or more user interfaces, preferably comprising a keypad 13, 14, a display device 15, 16, and audio means, e.g. a microphone 17, a speaker 18 and a codec 19.

In FIG. 1, it is assumed that the functions related to call management (CM) are implemented in the wireless communication device MT1 and in both the wireless mobile switching centre 4 and the packet data access node 5. These call management functions constitute the means for initializing, maintaining and terminating a call. Consequently, the wireless communication device MT1 and the wireless mobile switching centre 4 or the packet data access node 5 exchange call signalling messages to initialize, maintain and terminate a call. The functions of bearer management (BM) and radio resource management (RM) are implemented in the wireless communication device MT1 and in the radio network controller 3. The bearer management functions are utilized to select, for example, one or several logical channels according to the properties of the bearer service selected for communication between the wireless communication device MT1 and the base station 2, to provide a quality of service complying with the bearer service. The radio resource management functions are used, for example, to select the radio channel for the radio communication between the wireless communication device MT1 and the base station 2.

The packet data transmission connection between the wireless communication device MT1 and the IP network 7 can be set up from the packet data access node 5 (PDAN) via the packet data backbone 6 and the packet data gateway 8 (PDG). It is possible to set up a circuit switched data transmission connection between the wireless communication device MT1 and the mobile communication network via the radio access node 1, the wire-less mobile switching centre 4 and the gateway to mobile services switching centre 9 (GWMSC). This gateway to mobile services switching centre 9 comprises means for setting up a connection between the mobile communication network and the second network NW2, such as GSM, PSTN or ISDN.

Figure 3:
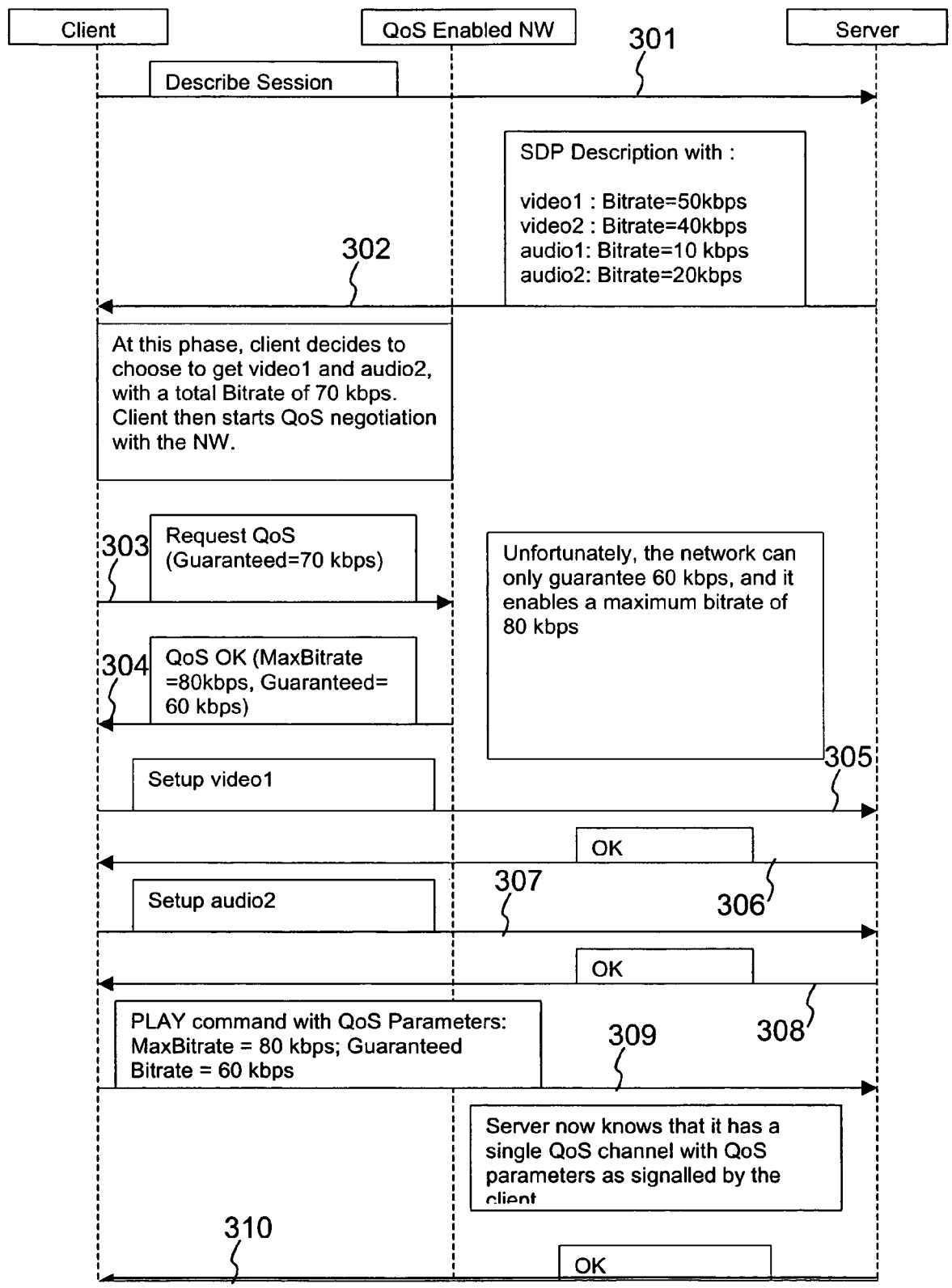
FIG. 3 shows a signalling diagram of QoS reservation and session control for a client with a single PDP context.

In the following, the method according to the a preferred embodiment of the present invention for streaming multimedia applications will be described with reference to the system of FIG. 1 and the signalling diagrams of FIGS. 3 and 4. The following implementations are based on the usage of RTSP protocol. Also, the "QoSParams, MaxBW, GuaBW, TdelayMax and url" parameters are fictitious parameter names which are conceptual placeholders for the above-explained invention. They may be named differently in real-life implementations.

First, some terms will be defined. A Client is a wireless communication device MT1 and a Server is a streaming multimedia service provider (e.g. server 10 in FIG. 1) to the Client. A Multimedia Session is an interval of time during which multimedia related data is exchanged between the Client and the Server. A Multimedia Session Set-up Phase is the time interval during which the Client and the Server exchange multimedia session related set-up information, e.g. multimedia components to be used during the session, bandwidth information, multimedia codec related information, etc. A PDP context is the logical indication of an abstract bound between the QoS Resource reservation process and the mobile station running the streaming client.

The Client may be in a QoS (Quality of Service) enabled network NW1, which can provide some guarantees to the Client based on its resources. These guarantees may cover one or more of the following:

Maximum Bit rate (MaxBW): The Maximum bandwidth that can be used by the negotiated media component or the total multimedia session.

Guaranteed Bit rate (GuaBW): The bandwidth value that the QoS reservation procedure guarantees to the client for the negotiated media component or the total multimedia session.

Transfer delay (TDelayMax): the delay (in milliseconds) that each data unit experiences during the transmission from the server to the client and vice-versa.

Other parameters can also be defined but they are not described in detail here.

The invention covers the two different possibilities that the client can experience based on its ability to have multiple or single PDP contexts during a multimedia session.

First, the situation in which the client is only able to handle a single PDP context at a time will be described in more detail. In other words, a client with a single PDP context support can have a single QoS resource reservation at a single time, which spans all the media components (i.e. audio, video, etc) during the multimedia session. This means that the multimedia data, regardless of being a video or audio, etc. data, share the same transmission channel with the same QoS resources.

In the first scenario, an aggregate controlled session is activated for the wireless communication device MT1 (client) having only single PDP context support for the streaming session. In this scenario, if the wireless communication device MT1 has multiple media components to Set-Up for the session (e.g. an audio and also an accompanying video stream), then the client must not send the negotiated QoS parameters such as maximum bit rate MaxBW, guaranteed bit rate GuaBW, maximum transfer delay TdelayMax and any other QoS profile parameters to the server 10 during the Set-Up phase because of the problem described in the background art section of this application.

The QoS negotiated parameters must be sent to the server at or after the transmission of the stream is activated i.e. at or after a Play command has been transmitted from the wireless communication device MT1 to the server 10.

The command sequence could be as follows (FIG. 3):

The wireless communication device MT1 transmits 301 a Describe Session command to the server 10.

```
DESCRIBE rtsp://server.com/session1.3gp RTSP/1.0
CSeq: 1
Accept: application/sdp
```

The server 10 replies to this command by transmitting 302 SDP description including information on different media streams.

```
RTSP/1.0 200 OK
CSeq: 1
Content-Base: rtsp://server.com/session1.3gp/
Content-Type: application/sdp
Content-Length: 441
v=0
o=- 3242987154 3242987154 IN IP4 111.111.111
s= session1.3gp
c=IN IP4 0.0.0.0
t=0 0
a=control:*
a=range:npt=0-60
m=video 0 RTP/AVP 96
b=AS:50
```

-continued

```
a=rtpmap:96 H263-2000/90000
a=control:trackID=2
a=range:npt=0-60
a=fmtp:96 profile=0;level=10
m=video 0 RTP/AVP 98
b=AS:40
a=rtpmap:98 H263-2000/90000
a=control:trackID=3
a=range:npt=0-60
a=fmtp:98 profile=0;level=10
m=audio 0 RTP/AVP 97
b=AS:10
a=rtpmap:97 AMR/8000/1
a=control:trackID=1
a=range:npt=0-60
a=fmtp:97 octet-align=1
m=audio 0 RTP/AVP 99
b=AS:20
a=rtpmap:99 AMR-WB/16000
a=control:trackID=4
a=range:npt=0-60
a=fmtp:99 octet-align=1
```

In the above SDP description, video1 has a b=AS definition of 50 kbps, video2 has a b=AS definition of 20 kbps, audio1 has a b=AS definition of 10 kbps and audio2 has a b=AS definition of 20 kbps.

Then, in the wireless communication device MT1 a selection is made, for example by the user, among the informed media to select the streams to be transmitted to the wireless communication device MT1. In this example it is assumed that video1 (50 kbps) and audio2 (20 kbps) are selected having a total bit rate of 70 kbps. After that the wireless communication device sends 303 a request for a bearer service to the communication network NW1. In the request the wireless communication device MT1 includes the wanted QoS parameters (maximum bit rate of 70 kbps) for all the media components.

In this example the network can only guarantee 60 kbps and enable a maximum bit rate of 80 kbps. Then, the network NT1 informs 304 the wireless communication device MT1 of the granted QoS parameters for the bearer service. After negotiating with the network for the bearer service for the PDP session, the wireless communication device MT1 transmits 305 a first setup message to the server 10 for informing the selected first medium stream, i.e. video1.

```
SETUP rtsp://server.com/session1.3gp/trackID=2 RTSP/1.0
CSeq: 2
Transport:RTP/AVP/UDP;unicast;client_port=6984-
6985;ssrc=31336d02
```

The server 10 replies 306 with OK message, if the selection is ok.

```
RTSP/1.0 200 OK
CSeq: 2
Session: 41
Transport:RTP/AVP/UDP;unicast;client_port=6984-
6985;server_port=6900-6901;ssrc=1d12115
```

The wireless communication device MT1 also transmits 307 a second setup message to the server 10 for informing the selected second medium stream, i.e. audio2.

```
SETUP rtsp://server.com/session1.3gp/trackID=4 RTSP/1.0
CSeq: 3
Transport:            RTP/AVP/UDP;unicast;client_port=6986-
6987;ssrc=37115e8d
Session: 41
```

The server 10 replies 308 with OK message, if the selection is ok.

```
RTSP/1.0 200 OK
CSeq: 3
Session: 41
Transport:RTP/AVP/UDP;unicast;client_port=6986-
6987;server_port=6902-6903;ssrc=7475313
```

The playback of the media streams is initiated by transmitting 309 a Play command from the wireless communication device MT1 to the server 10. In this case the Play command is included with information on at least the QoS parameters relating to the maximum bit rate and guaranteed bit rate which the network NT1 has granted.

```
PLAY rtsp://server.com/session1.3gp RTSP/1.0
CSeq: 4
Session: 41
QoSParams: MaxBW=80; GuaBW=60;TDelayMax=500
Range: npt=0-
```

The server replies to the command by sending OK to the wireless communication device MT1.

```
RTSP/1.0 200 OK
CSeq: 4
Session: 41
Range: npt=0-
RTP-Info:
url=rtsp://server.com/session1.3gp/trackID=2;seq=0;rtptime=10000,
url= rtsp://server.com/session1.3gp/trackID=4;seq=0;rtptime=10000
```

Now, when the server 10 has received the Play command it knows that there exists a single QoS channel with QoS parameters signalled by the wireless communication device MT1 and the server 10 can adapt the transmission of the selected media streams according to the parameters.

After the Play command, the wireless communication device MT1 may update the negotiated QoS parameters for the whole multimedia session, using any other RTSP command defined within the context of the streaming system.

If the multimedia session is a non-aggregate controlled session (e.g. the audio and video data is retrieved from two separate servers), then the wireless communication device MT1 should not send the QoS parameters, as the separate media servers are not aware of each other, nor they are aware of the fact that the media components share the same QoS reserved channel.

Second, the situation in which the client is able to support multiple PDP contexts at a time will be described in more detail. In other words, a client with multiple PDP context support can have multiple QoS resource reservations at a single time, which can be distributed between the media components (i.e. audio, video, etc) during the multimedia session. There can be a separate multimedia session for each media component (i.e. audio, video, etc) during the multimedia session. All the media components can have different QoS resource reservations.

In the second scenario, if the wireless communication device MT1 has multiple media components to setup for the session, and if the wireless communication device MT1 is willing to activate multiple PDP contexts for different media components, and also if the session control protocol does not allow media component url indicators to differentiate between media components, then the wireless communication device MT1 must not send the QoS negotiated MaxBW, GuaBW, TDelayMax and other QoS profile parameters to the server at the Play command, which will most probably be an addition of these parameters. The QoS parameters should instead be sent during the setup phase of each media component.

The command sequence could be as follows (FIG. 4):

The wireless communication device MT1 transmits 401 a Describe Session command to the server 10.

```
DESCRIBE rtsp://server.com/session1.3gp RTSP/1.0
CSeq: 1
Accept: application/sdp
```

The server 10 replies to this command by transmitting 402 SDP description including information on different media streams.

```
RTSP/1.0 200 OK
CSeq: 1
Content-Base: rtsp://server.com/session1.3gp/
Content-Type: application/sdp
Content-Length: 441
v=0
o=- 3242987154 3242987154 IN IP4 111.111.111
s= session1.3gp
c=IN IP4 0.0.0.0
t=0 0
a=control:*
a=range:npt=0-60
m=video 0 RTP/AVP 96
b=AS:50
a=rtpmap:96 H263-2000/90000
a=control:trackID=2
a=range:npt=0-60
a=fmtp:96 profile=0;level=10
m=video 0 RTP/AVP 98
b=AS:40
a=rtpmap:98 H263-2000/90000
a=control:trackID=3
a=range:npt=0-60
a=fmtp:98 proflle=0;level=10
m=audio 0 RTP/AVP 97
b=AS:10a=rtpmap:97 AMR/8000/1
a=control:trackID=1
a=range:npt=0-60
a=fmtp:97 octet-align=1
m=audio 0 RTP/AVP 99
b=AS:20
a=rtpmap:99 AMR-WB/16000
a=control:trackID=4
a=range:npt=0-60
a=fmtp:99 octet-align=1
```

In the above SDP description, video1 has a b=AS definition of 50 kbps, video2 has a b=AS definition of 20 kbps, audio1 has a b=AS definition of 10 kbps and audio2 has a b=AS definition of 20 kbps.

Then, in the wireless communication device MT1 a selection is made, for example by the user, among the informed media to select the streams to be transmitted to the wireless communication device MT1. In this example it is assumed that video1 having a bit rate of 50 kbps and audio2 having a bit rate of 20 kbps are selected. After that the wireless communication device sends 403 a first request for a first bearer service to the communication network NW1. In the request the wireless communication device MT1 includes the wanted QoS parameters (guaranteed bit rate of 50 kbps) for the first media component (video1). In this example the network can only guarantee 50 kbps and enable a maximum bit rate of 80 kbps. Then, the network NT1 informs 404 the wireless communication device MT1 of the granted QoS parameters for the first bearer service. Next, the wireless communication device sends 405 a second request for a second bearer service to the communication network NW1. In the request the wireless communication device MT1 includes the wanted QoS parameters (guaranteed bit rate of 20 kbps) for the second media component (audio1). In this example the network can only guarantee 20 kbps and enable a maximum bit rate of 40 kbps. Then, the network NT informs 406 the wireless communication device MT1 of the granted QoS parameters for the second bearer service. After negotiating with the network for the bearer services for the PDP sessions, the wireless communication device MT1 transmits 407 a first setup message to the server 10 for informing the selected first medium stream, i.e. video1.

```
SETUP rtsp://server.com/session1.3gp/trackID=2 RTSP/1.0
CSeq: 2
Transport:              RTP/AVP/UDP;unicast;client_port=6984-
6985;ssrc=31336d02
QoSParams:url=
rtsp://server.com/session1.3gp/trackID=2;MaxBW=80;GuaBW=50;
TDelayMax=500
```

The server 10 replies 408 with OK message, if the selection is ok.

```
RTSP/1.0 200 OK
CSeq: 2
Session: 41
Transport:RTP/AVP/UDP;unicast;client_port=6984-
6985;server_port=6900-6901;ssrc=1d12115
```

The wireless communication device MT1 also transmits 409 a second setup message to the server 10 for informing the selected second medium stream, i.e. audio2.

```
SETUP rtsp://server.com/session1.3gp/trackID=4 RTSP/1.0
CSeq: 3
Transport:              RTP/AVP/UDP;unicast;client_port=6986-
6987;ssrc=37115e8d
Session: 41
QoSParams: MaxBW=40;GuaBW=20;TDelayMax=500
```

The server 10 replies 410 with OK message, if the selection is ok.

```
RTSP/1.0 200 OK
CSeq: 3
Session: 41
Transport:RTP/AVP/UDP;unicast;client_port=6986-
6987;server_port=6902-6903;ssrc=7475313
```

The playback of the media streams is initiated by transmitting 411 a Play command from the wireless communication device MT1 to the server 10.

```
PLAY rtsp://server.com/session1.3gp RTSP/1.0
CSeq: 4
Session: 41
Range: npt=0-
```

In this case the Play command is not included with information on the QoS parameters relating to the maximum bit rate and guaranteed bit rate which the network NT1 has granted.

The server replies to the command by sending OK to the wireless communication device MT1.

```
RTSP/1.0 200 OK
CSeq: 4
Session: 41
Range: npt=0-
RTP-Info:
url=rtsp://server.com/session1.3gp/trackID=2;seq=0;rtptime=10000,
url=rtsp://server.com/session1.3gp/trackID=4;seq=0;rtptime=10000
```

Alternatively, in the RTSP PLAY request, the wireless communication device MT1 could have done the following:

```
PLAY rtsp://server.com/session1.3gp RTSP/1.0
CSeq: 4
Session: 41
Range: npt=0-
QoSParams:                                               url=
rtsp://server.com/session1.3gp/trackID=2;MaxBW=80;GuaBW=50;TDe-
layMax=500,url=
rtsp://server.com/session1.3gp/trackID=4;MaxBW=40;GuaBW=20;TDe-
layMax=500
```

Now, the server can identify which QoS parameters are assigned with which media component, based on its media component URL.

```
Server -> Client: OK
RTSP/1.0 200 OK
CSeq: 4
Session: 41
Range: npt=0-
RTP-Info:
url=rtsp://server.com/session1.3gp/trackID=2;seq=0;rtptime=10000,
url=rtsp://server.com/session1.3gp/trackID=4;seq=0;rtptime=10000
```

Now, when the server 10 has received the Play command it knows that there exists multiple QoS channels with individual QoS parameters signalled by the wireless communication device MT1. As each media component will have its own set of QoS negotiated parameters valid for each PDP context, the server can safely associate each media component to the correct QoS negotiated channel, with the correct values assigned.

If a QoS re-negotiation occurs for a particular PDP context (i.e. a particular media component), the client can signal the new QoS values using any of the available RTSP commands, by correctly referencing the media component for which the changes has occurred.

If the session control protocol allows media component url indicators to differentiate between media components, then the QoS Parameters can be signalled at the Play request too. The following pseudo-command sequence shows the possible scenario:

```
Client -> Server : Setup (media component 1)
Server -> Client : OK
Client -> Server : Setup (media component 2)
Server->Client : OK
Client -> Server : Play (URL of media component 1 + Negotiated QoS
parameters for the media component 1; URL of media component 2 +
Negotiated QoS parameters for the media component 2)
Server -> Client : OK
```

In the above example, the server can differentiate between the media components and the QoS Parameters assigned for each component by the usage of the "media component URL" information. This field is a unique identifier of the media component in a session. If the client and the server can make use of such a parameter, then the wireless communication device MT1 may choose to send the QoS Parameters either at the Set-Up phase, or at the Play phase. This media component URL indicator also gives the possibility to the wireless communication device MT1 to update the QoS Parameters during the session, if a QoS re-negotiation occurs.

If the multimedia session is a non-aggregate controlled session (e.g. the audio and video data is retrieved from two separate servers), then the client can safely signal the QoS negotiated parameters at the Set-Up command, as well as the Play command, since there will be separate Play commands for each media component.

The media component URL field may also be present to identify the session URL in the first example but the restriction on not sending the QoS Parameters at Set-Up phase is still valid for that case.

If a QoS parameter set does not contain the media component URL, then the request URL of the streaming control protocol must be used as the main URL for QoS parameter assigning.

It is obvious that the present invention is not limited solely to the above-presented embodiments but it can be modified within the scope of the appended claims.

What is claimed is:

1. A method comprising:

selecting at least one media stream to be transmitted from a second device to a first device, said selecting at least partly via a wireless communication network;

defining quality of service requirements for transmitting said selected at least one media stream;

reserving transmission resources from the wireless communication network for the transmission of said at least one media stream;

performing a setup procedure between the first device and the second device for activating at least one packet data transmission connection;

requesting by the first device the start of transmission of the at least one media stream;

transmitting the selected at least one media stream from the second device to the first device, the transmitting using one data transmission Packet Data Protocol context in the transmission of the selected at least one media stream, wherein information on the granted reserved resources is transmitted from the second device to the first device either at or after said requesting the start of transmission of the at least one media stream by the first device, if a single packet data transmission connection is shared by more than one multimedia stream; or at said setup procedure, if a separate packet data transmission connection is activated for each media stream.

2. The method according to claim 1 comprising defining at least the following parameters for the data transmission connection:

maximum bit rate,
guaranteed bit rate,
transfer delay;

and informing said parameters to the second device.

3. The method according to claim 1, comprising:

selecting at least a first media stream and a second media stream;

activating a first packet data transmission connection for the first media stream;

activating a second packet data transmission connection for the second media stream;

transmitting a first setup message for the first packet data transmission connection comprising information on the media component and information on the resources reserved for the first packet data transmission connection; and transmitting a second setup message for the second packet data transmission connection comprising information on the media component and information on the resources reserved for the second packet data transmission connection.

4. The method according to claim 1, comprising:

selecting at least a first media stream and a second media stream;

activating one packet data transmission connection for the first and the second media stream;

transmitting the setup message for the first packet data transmission connection comprising information on the selected media streams but no information on the resources reserved for said one packet data transmission connection; and transmitting a play message comprising information on the resources reserved for said one packet data transmission connection.

5. A method comprising:

selecting at least one media stream to be transmitted from a second device to a first device, said selecting at least partly via a wireless communication network, defining quality of service requirements for transmitting said selected at least one media stream, reserving transmission resources from the wireless communication network for the transmission of said at least one media stream, performing a setup procedure between the first device and the second device for activating at least one packet data transmission connection, requesting by the first device the start of transmission of the at least one media stream, and transmitting media streams from the second device to the first device at least partly via the wireless communication network, the transmitting using one data transmission Packet Data Protocol context for each selected media stream, wherein information on the granted reserved resources is received by the first device from the wireless communication network, and transmitted from the first device to the second device in connection with the setup procedure.

6. A communication system comprising:

a first device;

a second device, said first device and said second device configured to transmit media streams to each other at least partly via a wireless communication network, the communication system further configured:

to select at least one media stream to be transmitted to the first device, to define quality of service requirements for transmitting said selected at least one media stream, to reserve transmission resources from the wireless communication network for the transmission of said at least one media stream to perform a setup procedure between the first device and the second device for activating one packet data transmission connection to request the start of transmission of the at least one media stream by the first device, to use one data transmission Packet Data Protocol context in the transmission of the selected at least one media stream, and to transmit information on the reserved resources from the first device to the second device either at or after the start of transmission of the at least one media stream is requested by the first device, if a single packet data transmission connection is shared by more than one multimedia stream, or at said setup procedure, if a separate packet data transmission connection is activated for each media stream.

7. A communication system comprising:

a first device, a second device, said first device and said second device configured to transmit media streams to each other at least partly via a wireless communication network using at least one packet data transmission connection, the communication system further configured:

to select at least one media stream to be transmitted to the first device, to define quality of service requirements for transmitting said selected at least one media stream, to reserve transmission resources from the wireless communication network for the transmission of said at least one media stream, to perform a setup procedure between the first device and the second device for activating the at least one packet data transmission connection, to request the start of transmission of the at least one media stream by the first device, to use one data transmission Packet Data Protocol context in the transmission of the selected at least one media stream, and to transmit information on the reserved resources from the first device to the second device in connection with the setup procedure.

8. The communication system according to claim 7, configured for defining at least the following parameters for the data transmission connection:
   maximum bit rate,
   guaranteed bit rate,
   transfer delay.

9. A device comprising:
   a receiver configured to receive a request from another device for reserving transmission resources from the wireless communication network for the transmission of at least one media stream;
   a processor configured to reserve resources for the transmission of at least one media stream;
   a transmitter configured to transmit the at least one media stream to the another device, said transmitter being configured to send a setup message in connection with a setup procedure between said device and the another device for activating the at least one packet data transmission connection;
   wherein the processor is further configured to use at least one data transmission Packet Data Protocol context in the transmission of the selected at least one media stream; and
   wherein the receiver is configured to receive information on the reserved transmission resources from the device via the wireless communication network either in connection with the setup procedure, if a separate packet data transmission connection is activated for each media stream, or at or after the start of transmission of the at least one media stream is requested by the another device, if a single packet data transmission connection is shared by more than one multimedia stream.

10. A device comprising:
    a receiver configured to receive media streams from another device at least partly via a wireless communication network using at least one packet data transmission connection;
    a processor configured to select at least one media stream to be transmitted from the another device to said device;
    wherein the processor is further configured:
    to define quality of service requirements for transmitting the selected at least one media stream;
    to request transmission resources from the wireless communication network for the transmission of said at least one media stream; and
    to perform a setup procedure between said device and the another device for activating the at least one packet data transmission connection;
    wherein said device further comprises a transmitter for transmitting information on the granted reserved resources to the another device; and wherein the processor is further configured:
    to request the start of transmission of the at least one media stream from the device for transmitting; and to use one data transmission context in the transmission of the selected at least one media stream,
    wherein said transmitter is configured to transmit said information on the granted reserved resources to the another device either in connection with the setup procedure if a separate packet data transmission connection is activated for each media stream, or at or after the start of transmission of the at least one media stream is requested by the another device, if a single packet data transmission connection is shared by more than one multimedia stream.

11. A wireless communication device comprising:
    a receiver configured to receive media streams from another device at least partly via a wireless communication network using at least one packet data transmission connection;
    a processor configured:
    to select at least one media stream to be transmitted from the another device to the wireless communication device;
    to define quality of service requirements for transmitting the selected at least one media stream;
    to request transmission resources from the wireless communication network for the transmission of said at least one media stream;
    to perform a setup procedure between the wireless communication device and the another device for activating the at least one packet data transmission connection;
    a transmitter configured to transmit information on the granted reserved resources to the another device;
    wherein the processor is further configured:
    to request the start of transmission of the at least one media stream from the another device; and
    to use one data transmission Packet Data Protocol context in the transmission of the selected at least one media stream,
    wherein said transmitter is configured to transmit said information on the granted reserved resources to the another device either in connection with the setup procedure, if a separate packet data transmission connection is activated for each media stream, or at or after the start of transmission of the at least one media stream is requested by the another device, if a single packet data transmission connection is shared by more than one multimedia stream.

12. The wireless communication device according to claim 11, wherein the processor configured to request transmission resources from the wireless communication network for the transmission of said at least one media stream is configured to define a setup message.

13. The wireless communication device according to claim 11, wherein the processor configured to request the start of transmission of the at least one media stream from the device for transmitting is configured to define a play message.

14. A network element comprising:
    a receiver configured to receive information on a selection of at least one media stream to be transmitted to a device at least partly via a wireless communication network using at least one packet data transmission connection;
    a processor configured:
    to receive quality of service requirements for transmitting said selected at least one media stream; and
    to request transmission resources from the wireless communication network for the transmission of said at least one media stream;
    a transmitter configured to transmit the selected at least one media stream to the device, said transmitter being configured to send a setup message in connection with a setup procedure between the device and the network element for activating the at least one packet data transmission connection;
    wherein the processor is further configured to use one data transmission Packet Data Protocol context in the transmission of the selected at least one media stream; and
    wherein the receiver is configured to receive information on the reserved transmission resources from the device for receiving via the wireless communication network either in connection with the setup procedure, if a separate packet data transmission connection is activated for each media stream, or at or after the start of transmission of the at least one media stream is requested by the device, if a single packet data transmission connection is shared by more than one multimedia stream.

15. A method in a communication system comprising:
transmitting media streams from a second device to a first device at least partly via a wireless communication network,
selecting at least one media stream to be transmitted to the first device
defining quality of service requirements for transmitting said selected at least one media stream,
reserving transmission resources from the wireless communication network for the transmission of said at least one media stream
performing a setup procedure between the second device and the first device for activating one packet data transmission connection,
requesting the start of transmission of the at least one media stream by the first device, and
using one data transmission Packet Data Protocol context in the transmission of the selected at least one media stream,
wherein information on the reserved resources is transmitted from the first device to the second device at or after the start of transmission of the at least one media stream is requested by the first device.

16. A method in a communication system comprising:
transmitting media streams from a second device to a first device at least partly via a wireless communication network,
selecting at least one media stream to be transmitted to the first device,
defining quality of service requirements for transmitting said selected at least one media stream,
reserving transmission resources from the wireless communication network for the transmission of said at least one media stream
performing a setup procedure between the second device and the first device for activating at least one packet data transmission connection,
requesting the start of transmission of the at least one media stream by the first device, and
using one data transmission Packet Data Protocol context for each selected media stream,
wherein information on the reserved resources is transmitted from the first device to the second device in connection with the setup procedure.

17. A method in a communication system comprising:
transmitting media streams from a second device to a first device at least partly via a wireless communication network using one data transmission Packet Data Protocol context,
the first device requesting information on quality of service requirements for transmitting at least one media stream from the second device to the first device,
the first device requesting transmission resources from the wireless communication network for the transmission of said at least one media stream,
the wireless communication network reserving resources for the transmission and transmitting information on the reserved resources to the first device, and
the second device and the first device performing a setup procedure for activating the one packet data transmission connection,
wherein the first device requests the start of transmission of the at least one media stream by transmitting a start of transmission command to the second device in which command also information on the reserved resources are transmitted to the second device.

18. A method in a communication system comprising:
transmitting media streams from a second device to a first device at least partly via a wireless communication network using at least one data transmission Packet Data Protocol context,
the first device requesting information on quality of service requirements for transmitting at least one media stream from the second device to the first device,
the first device requesting transmission resources from the wireless communication network for the transmission of said at least one media stream,
the wireless communication network reserving resources for the transmission and transmitting information on the reserved resources to the first device, and
the first device and the second device performing a setup procedure for activating the at least one packet data transmission connection, in which setup procedure the first device also transmits information on the reserved resources to the second device,
wherein the first device requests the start of transmission of the at least one media stream by transmitting a start of transmission command to the second device in which command no information on the reserved resources are transmitted to the second device.

19. A network element comprising:
means for receiving information on a selection of at least one media stream to be transmitted to a device at least partly via a wireless communication network using at least one packet data transmission connection;
means for receiving quality of service requirements for transmitting said selected at least one media stream;
means for requesting transmission resources from the wireless communication network for the transmission of said at least one media stream;
means for transmitting the selected at least one media stream to the device;
means for using one data transmission Packet Data Protocol context in the transmission of the selected at least one media stream; and
means for receiving information on the reserved transmission resources from the device for receiving via the wireless communication network in connection with the setup procedure,
wherein said means for transmitting being configured to send a setup message either in connection with a setup procedure between the device and the network element for activating the at least one packet data transmission connection, if a separate packet data transmission connection is activated for each media stream, or at or after the start of transmission of the at least one media stream is requested by the device, if a single packet data transmission connection is shared by more than one multimedia stream.

20. A processor configured:
to reserve resources from a wireless communication network for the transmission of a selected at least one media stream from a first device to a second device on a basis of a request received from the second device;
to reserve transmission resources from the wireless communication network for the transmission of said at least one media stream;
to send a setup message in connection with a setup procedure between the second device and the first device for activating at least one packet data transmission connection;

to use one data transmission Packet Data Protocol context in the transmission of said at least one media stream; and wherein the processor is further configured to receive information on the reserved transmission resources from the second device via the wireless communication network either in connection with the setup procedure, if a separate packet data transmission connection is activated for each media stream, or at or after the start of transmission of the at least one media stream is requested by the second device, if a single packet data transmission connection is shared by more than one multimedia stream.

21. An apparatus comprising:

at least one processor, and at least one memory including code, the at least one memory and the code configured to, with the at least one processor, cause the apparatus;

to receive media streams from a first device transmitted at least partly via a wireless communication network using at least one packet data transmission connection;

to select at least one media stream to be transmitted from the first device to a second device;

to define quality of service requirements for transmitting the selected at least one media stream;

to request transmission resources from a wireless communication network for the transmission of the selected at least one media stream;

to perform a setup procedure between the second device and the first device for activating the at least one packet data transmission connection, said setup procedure comprising transmitting information on the reserved resources to the first communication device, if a separate packet data transmission connection is activated for each media stream; and to request the start of transmission of the selected at least one media stream from the first device, said request comprising information on the reserved resources, if a single packet data transmission connection is shared by more than one multimedia stream; and to use one data transmission Packet Data Protocol context in the transmission of the selected at least one media stream.

22. The apparatus according to claim 21, configured to:

select at least a first media stream and a second media stream;

activate a first packet data transmission connection for the first media stream;

activate a second packet data transmission connection for the second media Stream;

transmit a first setup message for the first packet data transmission connection comprising information on the media component and information on the resources reserved for the first packet data transmission connection; and transmit a second setup message for the second packet data transmission connection comprising information on the media component and information on the resources reserved for the second packet data transmission connection.

23. The apparatus according to claim 21, configured to:

select at least a first media stream and a second media stream;

activate one packet data transmission connection for the first and the second media stream;

transmit the setup message for the first packet data transmission connection comprising information on the selected media streams but no information on the resources reserved for said one packet data transmission connection; and transmit a play message comprising information on the resources reserved for said one packet data transmission connection.

* * * * *